United States Patent
Moore et al.

(10) Patent No.: US 11,651,525 B2
(45) Date of Patent: May 16, 2023

(54) UTILIZING MACHINE LEARNING MODELS FOR INSERTING USER-GENERATED CONTENT INTO MEDIA CONTENT

(71) Applicant: Accenture Global Solutions Limited, Dublin (IE)

(72) Inventors: Daniel Moore, Columbus, OH (US); Ben Rogers, Dublin, OH (US)

(73) Assignee: Accenture Global Solutions Limited, Dublin (IE)

(*) Notice: Subject to any disclaimer, the term of this patent is extended or adjusted under 35 U.S.C. 154(b) by 115 days.

(21) Appl. No.: 17/139,516

(22) Filed: Dec. 31, 2020

(65) Prior Publication Data

US 2022/0207785 A1    Jun. 30, 2022

(51) Int. Cl.
*G06T 11/00* (2006.01)
*G06T 7/174* (2017.01)
(Continued)

(52) U.S. Cl.
CPC .............. *G06T 11/00* (2013.01); *G06T 7/174* (2017.01); *G06T 7/337* (2017.01); *G06V 10/82* (2022.01);
(Continued)

(58) Field of Classification Search
CPC ........ G06N 3/0454; G06N 3/08; G06N 20/00; G06N 3/088; G06N 7/005; G06N 3/04; G06T 13/40; G06T 2207/30201; G06T 2207/20084; G06T 2207/20081; G06T 11/60; G06T 2207/10016; G06T 13/80; G06T 11/00; G06T 11/001; G06T 15/04;
(Continued)

(56) References Cited

U.S. PATENT DOCUMENTS 10,552,977 B1 * 2/2020 Theis .................... G06T 11/001
10,559,111 B2 * 2/2020 Sachs ........................ G06T 7/13
(Continued)

OTHER PUBLICATIONS

Egor Zakharov, et al.; "Few-Shot Adversarial Learning of Realistic Neural Talking Head Models"; 2019 IEEE/CVF International Conference on Computer Vision (ICCV) (2019); retrieved Sep. 25, 2019; Skolkovo Institute of Science and Technology; 21 pages.
(Continued)

*Primary Examiner* — Phi Hoang
*Assistant Examiner* — Scott E Sonners
(74) *Attorney, Agent, or Firm* — Harrity & Harrity, LLP

(57) ABSTRACT

A system may receive captured content identifying a first face of a user of a user device and media content identifying a second face of a person. The system may process the captured content and the media content, using a first machine learning model, to determine embeddings for the captured content and to identify landmarks in the media content. The system may combine the captured content with the media content, based on the landmarks and the embeddings, to generate combined content and to segment a combined face of the combined content, to replace the second face of the media content with the combined face, and to generate new media content that includes the combined face. The system may process the new media content,
(Continued)

with a second machine learning model, to blend the combined face in the new media content and to generate final media content.

20 Claims, 10 Drawing Sheets

(51) Int. Cl.
  *G06T 7/33* (2017.01)
  *G06V 40/16* (2022.01)
  *G06V 10/82* (2022.01)
(52) U.S. Cl.
  CPC .......... *G06V 40/171* (2022.01); *G06V 40/172* (2022.01); *G06T 2207/20081* (2013.01); *G06T 2207/20084* (2013.01); *G06T 2207/30201* (2013.01)
(58) Field of Classification Search
  CPC . G06T 7/11; G06T 7/246; G06T 19/20; G06T 2207/10024; G06T 2207/20221; G06T 2207/30196; G06T 7/70; G06T 15/205; G06T 19/006; G06T 2210/44; G06V 10/82; G06V 40/171; G06V 20/46; G06V 40/161; G06V 40/172; G06V 40/174; G06V 40/166; G06V 40/165; G06V 40/168; G06V 10/40; G06V 40/175; H04N 21/4662
  See application file for complete search history.

(56) References Cited

U.S. PATENT DOCUMENTS

| | | | |
|---|---|---|---|
| 10,671,838 B1 | 6/2020 | Bogan, III et al. | |
| 10,803,646 B1* | 10/2020 | Bogan, III | G06V 40/174 |
| 11,138,781 B1* | 10/2021 | Linton | G06T 13/40 |
| 2019/0122329 A1* | 4/2019 | Wang | G06V 30/194 |
| 2019/0295302 A1 | 9/2019 | Fu et al. | |
| 2020/0294294 A1* | 9/2020 | Petriv | G06N 3/08 |
| 2020/0302184 A1* | 9/2020 | Lempitsky | G06V 40/169 |
| 2021/0227152 A1* | 7/2021 | Zhang | G06T 11/00 |
| 2022/0172438 A1* | 6/2022 | Savchenkov | G06N 20/00 |

OTHER PUBLICATIONS

Yuval Nirkin, et al.; "FSGAN: Subject Agnostic Face Swapping Reenactment"; 2019 IEEE/CVF International Conference on Computer Vision (ICCV) (2019); retrieved Aug. 16, 2019; 16 pages.
Extended European Search Report for Application No. EP21217998, dated May 24, 2022, 8 pages.
Mirsky et al., "The Creation and Detection of Deepfakes: A Survey," Georgia Institute of Technology, May 12, 2020, vol. 1 (1), pp. 1-36.

* cited by examiner

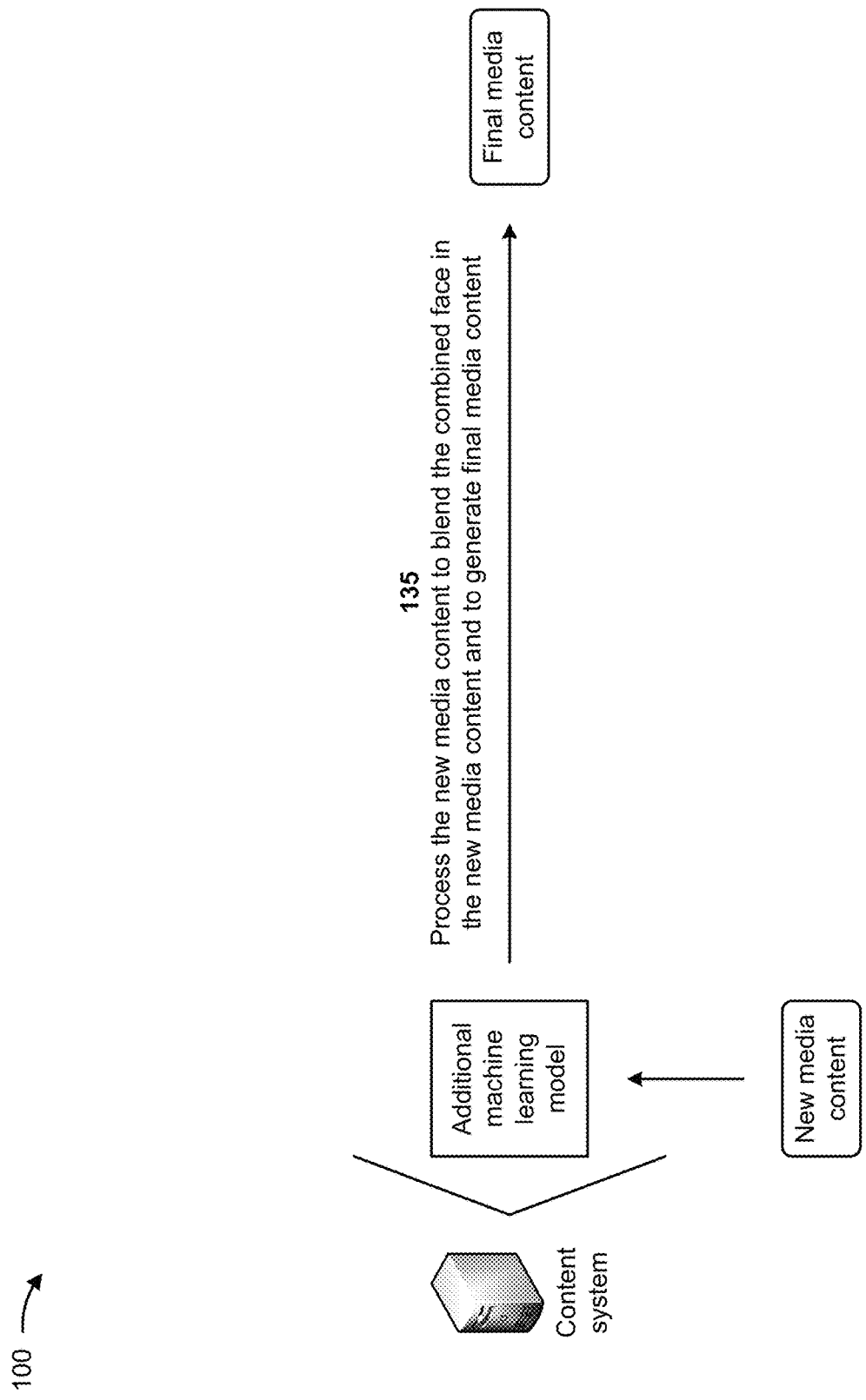

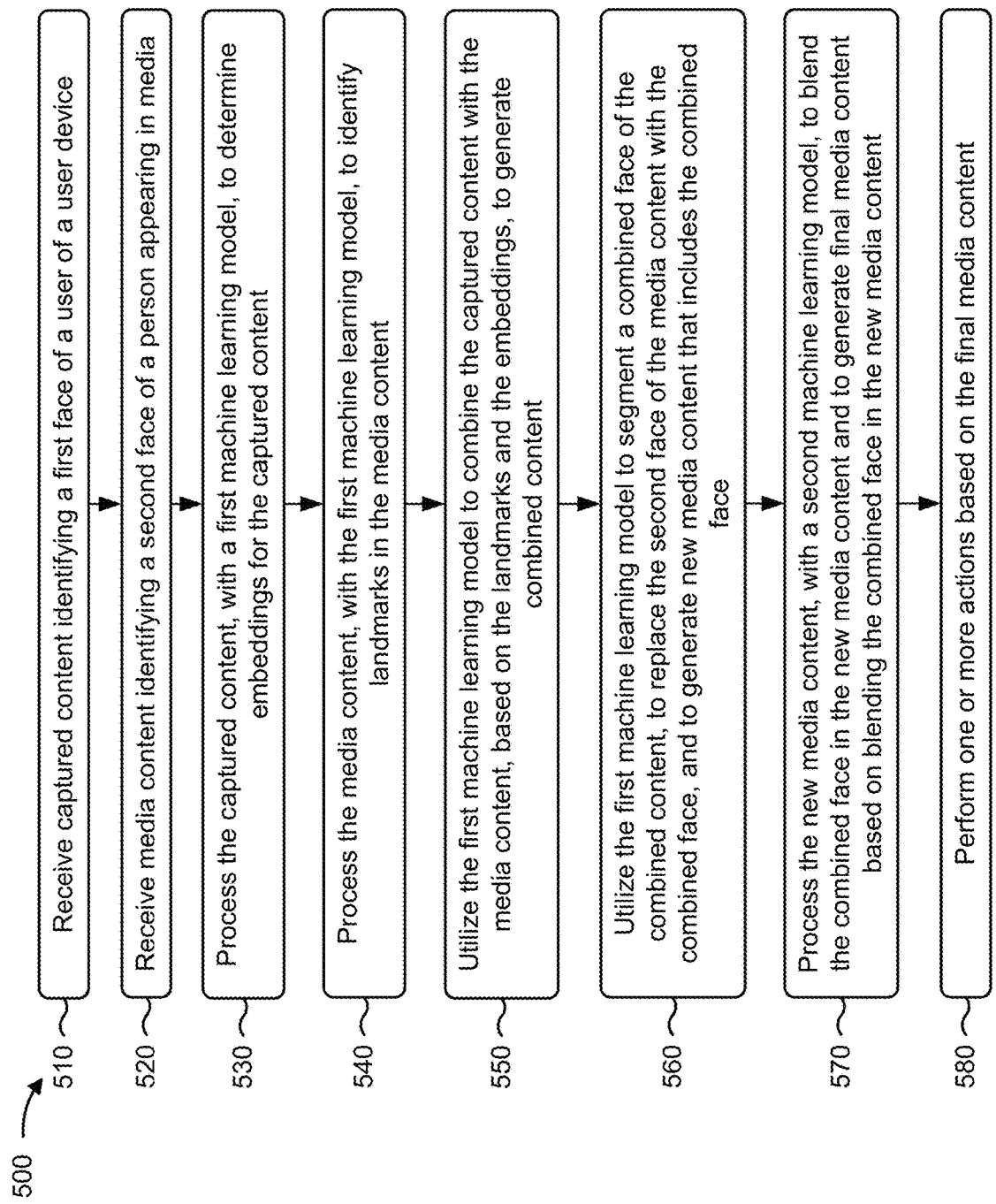

UTILIZING MACHINE LEARNING MODELS FOR INSERTING USER-GENERATED CONTENT INTO MEDIA CONTENT

BACKGROUND

Media content may include one or more images and/or audio content. For example, media content may include a movie, an advertisement, and/or a movie poster (e.g., that includes a digital image). A content provider may provide the media content to be viewed at specific locations (e.g., movie theaters) or may provide the media content to be viewed by specific devices (e.g., network connected user devices).

SUMMARY

In some implementations, a method includes receiving, by a computing system, captured content identifying a first face of a user of a user device; receiving, by the computing system, media content identifying a second face of a person appearing in media; processing, by the computing system, the captured content, with a first machine learning model, to determine embeddings for the captured content; processing, by the computing system, the media content, with the first machine learning model, to identify landmarks in the media content; utilizing, by the computing system, the first machine learning model to combine the captured content with the media content, based on the landmarks and the embeddings, to generate combined content; utilizing, by the computing system, the first machine learning model to segment a combined face of the combined content, to replace the second face of the media content with the combined face, and to generate new media content that includes the combined face; processing, by the computing system, the new media content, with a second machine learning model, to blend the combined face in the new media content and to generate final media content based on blending the combined face in the new media content; and performing, by the computing system, one or more actions based on the final media content.

In some implementations, a computing system includes one or more memories and one or more processors, communicatively coupled to the one or more memories, configured to: receive captured content identifying a first face of a user of a user device; receive media content identifying a second face of a person appearing in media; process the captured content, with a first machine learning model, to determine embeddings for the captured content; process the media content, with the first machine learning model, to identify landmarks in the media content; utilize the first machine learning model to combine the captured content with the media content, based on the landmarks and the embeddings, to generate combined content; utilize the first machine learning model to segment a combined face of the combined content, to replace the second face of the media content with the combined face, and to generate new media content that includes the combined face; process the new media content, with a second machine learning model, to blend the combined face in the new media content and to generate final media content based on blending the combined face in the new media content; and provide the final media content for display in a portion of one or more of: a movie associated with the person, an advertisement associated with the person, or a movie poster associated with the person.

In some implementations, a non-transitory computer-readable medium storing a set of instructions includes one or more instructions that, when executed by one or more processors of a computing system, cause the computing system to: receive captured content identifying a first face of a user of a user device; receive media content identifying a second face of a person appearing in media; crop the captured content to remove content other than the first face of the user and to generate first cropped content; crop the media content to remove content other than the second face of the person and to generate second cropped content; process the first cropped content, with a first machine learning model, to determine embeddings for the captured content; process the second cropped content, with the first machine learning model, to identify landmarks in the media content; utilize the first machine learning model to combine the captured content with the media content, based on the landmarks and the embeddings, to generate combined content; utilize the first machine learning model to segment a combined face of the combined content, to replace the second face of the media content with the combined face, and to generate new media content that includes the combined face; process the new media content, with a second machine learning model, to blend the combined face in the new media content and to generate final media content based on blending the combined face in the new media content; and perform one or more actions based on the final media content.

BRIEF DESCRIPTION OF THE DRAWINGS

FIGS. 1A-1F are diagrams of an example implementation described herein.

FIG. 5 is a flowchart of an example process relating to utilizing machine learning models for inserting user-generated content into media content.

DETAILED DESCRIPTION

Figure 1A:
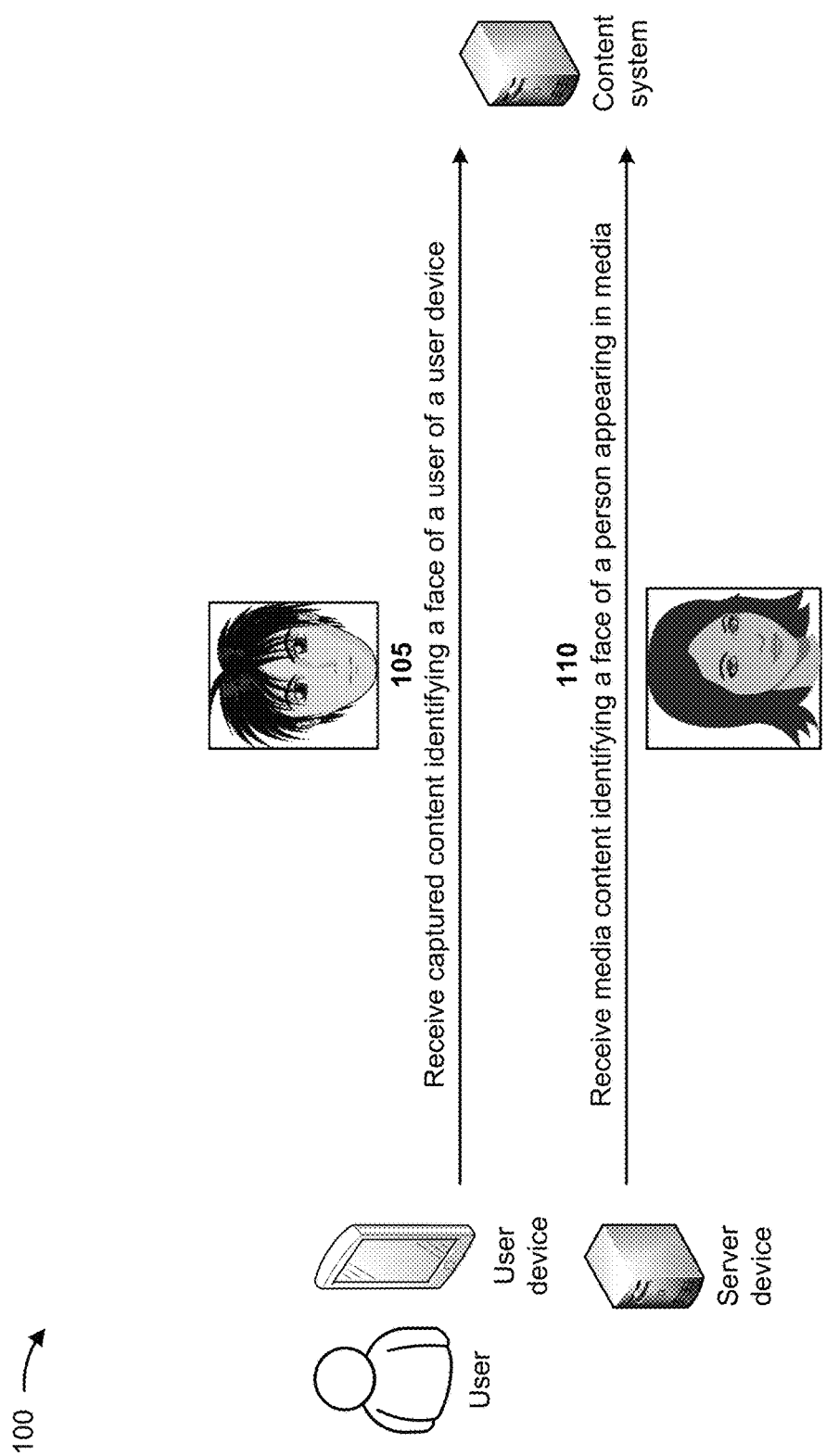

The following detailed description of example implementations refers to the accompanying drawings. The same reference numbers in different drawings may identify the same or similar elements.

A media content provider may use a processing device to modify media content to tailor the media content for a particular audience. For example, when the media content is a video advertisement to be presented to residents of a particular locality, the processing device may use a conventional face replacement video processing technique to insert a local sports team player's face on the face of an actor depicted in the video advertisement. However, such a face replacement video process technique requires substantial use of computing resources (e.g., processing resources, memory resources, communication resources, and/or power resources, among other examples) of the processing device. Moreover, in many cases, the inserted face does not appear to blend with the rest of the media content (e.g., resulting in a face that suffers from the "uncanny valley" effect). Consequently, a user may use a user device to manually edit the media content to cause the inserted face to appear as if it were originally included in the media contentment, which consumes computing resources of the user device.

Some implementations described herein provide a content system that utilizes machine learning models for inserting user-generated content into media content. In some implementations, the content system may receive captured content identifying a first face of a user of a user device and media content identifying a second face of a person. The system may process the captured content and the media content, using a first machine learning model, to determine embeddings for the captured content and to identify landmarks in the media content. The system may combine the captured content with the media content, based on the landmarks and the embeddings, to generate combined content that includes a combined face. The content system may segment the combined face of the combined content, to replace the second face of the media content with the combined face, and to generate new media content that includes the combined face. The system may process the new media content, with a second machine learning model, to blend the combined face in the new media content and to generate final media content. The content system may then perform one or more actions based on the final media content, such as providing the final media content for display in a portion of a movie associated with the person; providing the final media content for display in a portion of an advertisement (e.g., a video advertisement) associated with the person; or providing the final media content for display in a portion of a movie poster (e.g., a digital image movie poster) associated with the person.

In this way, the content system automatically inserts the face of the user into the media content to form final media content where the face of the user appears to blend with the final media content. No additional processing and/or editing of the final media content is required. Accordingly, the content system reduces use of computing resources (e.g., processing resources, memory resources, communication resources, and/or power resources, among other examples) of a computing device to use a conventional face replacement video processing technique to produce modified media content and/or of a user device to allow a user to manually edit the modified media content. Moreover, in some implementations, the content system is able to process the captured content and/or the media content (e.g., as described herein) to generate the final media content in near real-time relative to receiving the captured content and/or the media content. Accordingly, because, the content system efficiently consumes computing resources to generate the final media content, in many cases, the content system consumes less resources than would otherwise be used to generate the final media content using a conventional face replacement video processing technique and manual editing technique.

FIGS. 1A-1F are diagrams of an example implementation 100 associated with utilizing machine learning models for inserting user-generated content into media content. As shown in FIGS. 1A-1F, example implementation 100 includes a user device, a server device, and a content system. These devices are described in more detail below in connection with FIG. 2 and FIG. 3. The user device, the server device, and/or the content system may be connected via a network, such as a wired network (e.g., the Internet or another data network) and/or a wireless network (e.g., a wireless local area network, a wireless wide area network, a cellular network, and/or the like).

As shown in FIG. 1A, and by reference number 105, the content system may receive captured content identifying a face of a user of a user device. The captured content may include, for example, one or more images of the face of the user. The one or more images may depict an orientation of the face of the user, such as a front view of the face of the user, a side view of the face of the user, a downward view of the face of the user, and/or an upward view of the face of the user, among other examples; an expression of the face of the user, such as a neutral expression, a happy expression, an angry expression, an embarrassed expression, and/or a surprised expression, among other examples; and/or the like. The user of the user device may cause the user device to run an application that causes a camera device (e.g., that includes one or more cameras) of the user device to obtain the captured content (e.g., to capture the one or more images of the face of the user). In some implementations, the user device may provide the captured content to the content system, such as via the network that connects the user device and the content system.

As further shown in FIG. 1A, and by reference number 110, the content system may receive media content identifying a face of a person appearing in media. The media content may include one or more images from a video (e.g., that comprises a plurality of images and audio content), a movie (e.g., that comprises a plurality of images and audio content), or other media content, where the one or more images depict the face of the person. For example, the media content may include one or more images from a movie that depict a face of an actor in the one or more images. The one or more images may depict an orientation of the face of the person, an expression of the face of the person, and/or the like. The orientation of the face of the person and/or the expression of the face of the person depicted in the media content may be different than the orientation of the face of the user and/or the expression of the user depicted in the captured content. In some implementations, the server device may provide the media content to the content system, such as via the network that connects the server device and the content system.

Figure 1B:
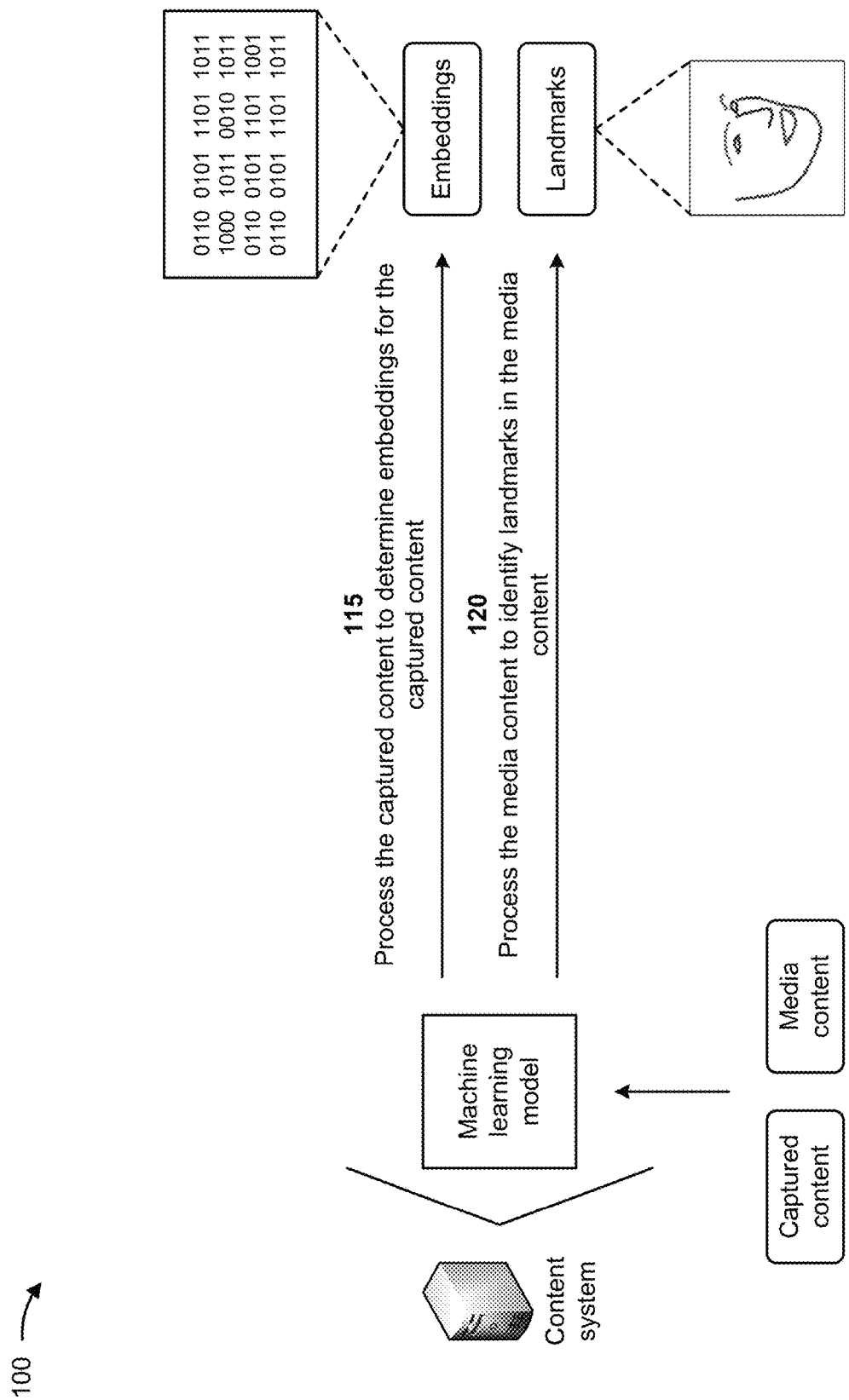

Turning to FIG. 1B, and reference number 115, the content system may process the captured content to determine embeddings for the captured content. In some implementations, the content system may process (e.g., using one or more computer vision techniques and/or a machine learning model, described herein) the one or more images of the captured content to determine the embeddings. The embeddings may represent a plurality of characteristics of the face of the user (e.g., a skin color, a hair texture, an eyebrow shape, a nose size, and/or the like of the face of the user) in a numerical fashion. For example, the embeddings may comprise a plurality of floating point numbers (shown in FIG. 1B as a series of bytes), where a set of floating point numbers is associated with a particular characteristic, of the plurality of characteristics, of the face of the user.

In some implementations, the content system may crop the captured content (e.g., may crop the one or more images of the captured content) to remove content other than the face of the user from the captured content to generate cropped captured content (e.g., one or more images that depict just the face of the user). The content system may process the cropped captured content (e.g., using the one or more computer vision techniques and/or the machine learning model described herein) to determine the embeddings for the captured content. In this way, the content system may reduce an amount of content, of the captured content, that the content system has to process to determine the embeddings for the captured content and thereby reduce an amount of computing resources (e.g., processing resources, memory resources, power resources, and/or communication resources, among other examples) that would otherwise be used to process the captured content (e.g., without cropping) to determine the embeddings.

As further shown in FIG. 1B, and by reference number 120, the content system may process the media content to identify landmarks in the media content. In some implementations, the content system may process (e.g., using one or more computer vision techniques and/or the machine learning model described herein) the one or more images of the media content to identify the landmarks. The landmarks may describe a pose of the face of the person (e.g., depicted in the media content), an orientation of the face of the person, and/or an expression of the face of the person, among other examples.

In some implementations, the content system may crop the media content (e.g., may crop the one or more images of the media content) to remove content other than the face of the person from the media content to generate cropped media content (e.g., one or more images that depict just the face of the person). The content system may process the cropped media content (e.g., using the one or more computer vision techniques and/or the machine learning model described herein) to determine the landmarks for the media content. In this way, the content system may reduce an amount of content, of the media content, that the content system has to process to determine the landmarks for the media content and thereby reduce an amount of computing resources (e.g., processing resources, memory resources, power resources, and/or communication resources, among other examples) that would otherwise be needed to process the media content (e.g., without cropping) to determine the landmarks.

Figure 1C:
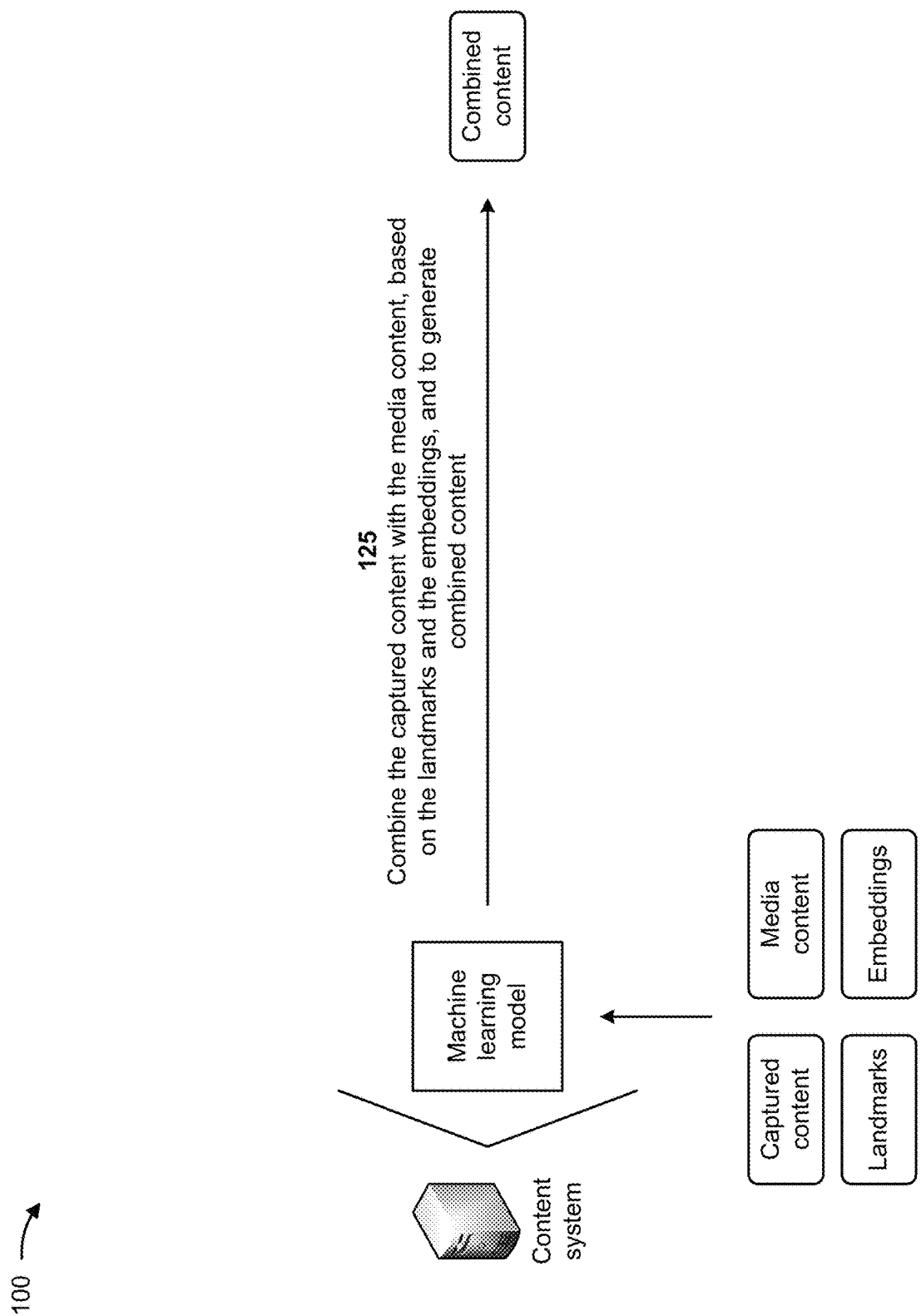

Turning to FIG. 1C, and reference number 125, the content system may combine the captured content (e.g., after the captured content has been cropped) with the media content (e.g., after the media content has been cropped), based on the landmarks and the embeddings, and to generate combined content. In some implementations, the content system may process the captured content, the media content, the landmarks, and the embeddings (e.g., using the one or more computer vision techniques and/or the machine learning model described herein) to generate the combined content. For example, the content system, using the machine learning model, may generate a map, based on the landmarks and the embeddings, that indicates a correlation between characteristics of the face of the user (e.g., that are associated with the embeddings) and a pose of the face of the person, an orientation of the face of the person, an expression of the face of the person, and/or the like (e.g., that are associated with the landmarks), and may combine the captured content with the media content using the map (e.g., to transfer the face of the user onto the face of the person) to generate the combined content. The combined content may include the one or more images of the captured content that include, overlaid on the one or more images of the captured content, a combined face that includes the characteristics of the face of the user and the pose, the orientation, the expression, and/or the like of the face of the person.

Figure 1D:
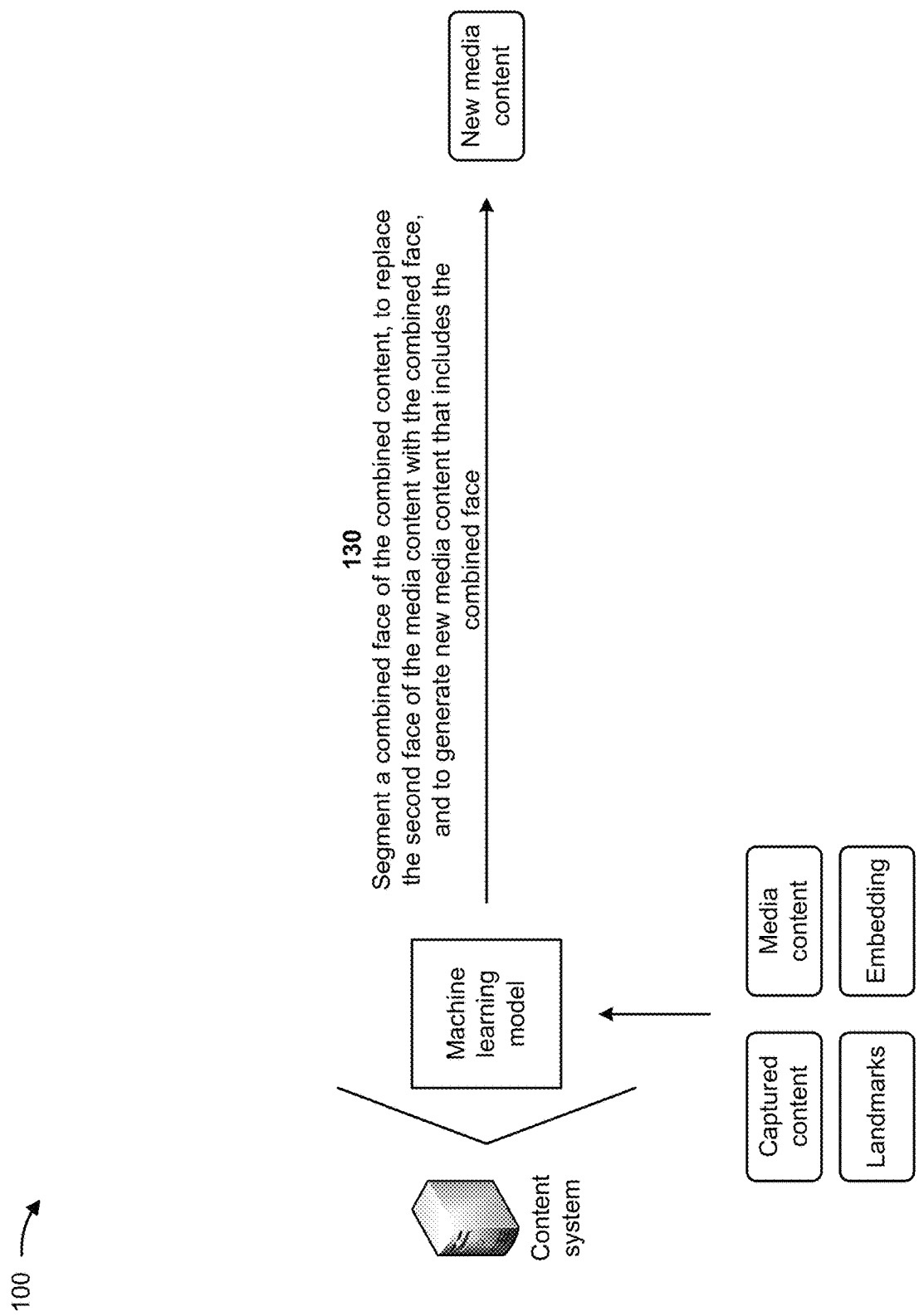

Turning to FIG. 1D, and reference number 130, the content system may segment the combined face of the combined content, to replace the face of the person of media content with the combined face, and to generate new media content that includes the combined face. In some implementations, the content system may process the combined content and the media content (e.g., using the one or more computer vision techniques and/or the machine learning model described herein) to generate the new media content. For example, the content system, using the machine learning model, may crop the one or more images of the combined content to remove content other than the combined face from the combined content to generate cropped combined content (e.g., one or more images that depict just the combined face) and may combine the cropped combined content and the media content to generate the new media content. Accordingly, the new media content may include the one or more images of the media content that include the combined face overlaid on the one or more images of the media content.

In some implementations, the content system may use a machine learning model to perform one or more of the steps described above in regard to FIGS. 1B-1D and reference numbers 115-130. The machine learning model may include, for example, a generative adversarial network (GAN) model, such as a talking head GAN model. The machine learning model may have been trained based on training data that may include example captured content, determinations of example embeddings for the example captured content, example media content, identifications of example landmarks in the example media content, example combined content generated by combining the example captured content and the example media content based on the example embeddings and the example landmarks, and/or example new media content generated by segmenting example combined faces of the example combined content, among other examples. Using the training data as input to the machine learning model, the machine learning model may be trained to identify one or more relationships (e.g., between the example captured content, the example embeddings, the example media content, the example landmarks, the example combined content, and/or the example new media content, among other examples) to determine embeddings for captured content, to identify landmarks in media content, to generate combined content, and/or to generate new media content. The machine learning model may be trained and/or used in a similar manner to that described below with respect to FIG. 2. The content system may include one or more devices (e.g., one or more data storage devices) that store the machine learning model.

Turning to FIG. 1E, and reference number 135, the content system may process the new media content to blend the combined face in the new media content and to generate final media content. For example, the content system may process (e.g., using the one or more computer vision techniques and/or an additional machine learning model, described herein) the new media content to cause the combined face of the new media content to appear to be seamlessly combined with the rest of the new media content to generate the final media content.

In some implementations, the content system may use the additional machine learning model to process the new media content to blend the combined face in the new media content and to generate the final media content. The additional machine learning model may include, for example, a GAN model, such as a face swapping GAN model. The additional machine learning model may have been trained based on training data that may include example new media content, example combined faces that have been blended based on the example new media content, and/or example final media content, among other examples. Using the training data as input to the additional machine learning model, the additional machine learning model may be trained to identify one or more relationships (e.g., between the example new media content, the example combined faces that have been blended, and/or the example final media content, among other examples) to generate the final media content. The additional machine learning model may be trained and/or used in a similar manner to that described below with respect to FIG. 2. The content system may include one or more devices (e.g., one or more data storage devices that are the same as or different from the data storage devices that store the machine learning model) that store the additional machine learning model.

Figure 1F:
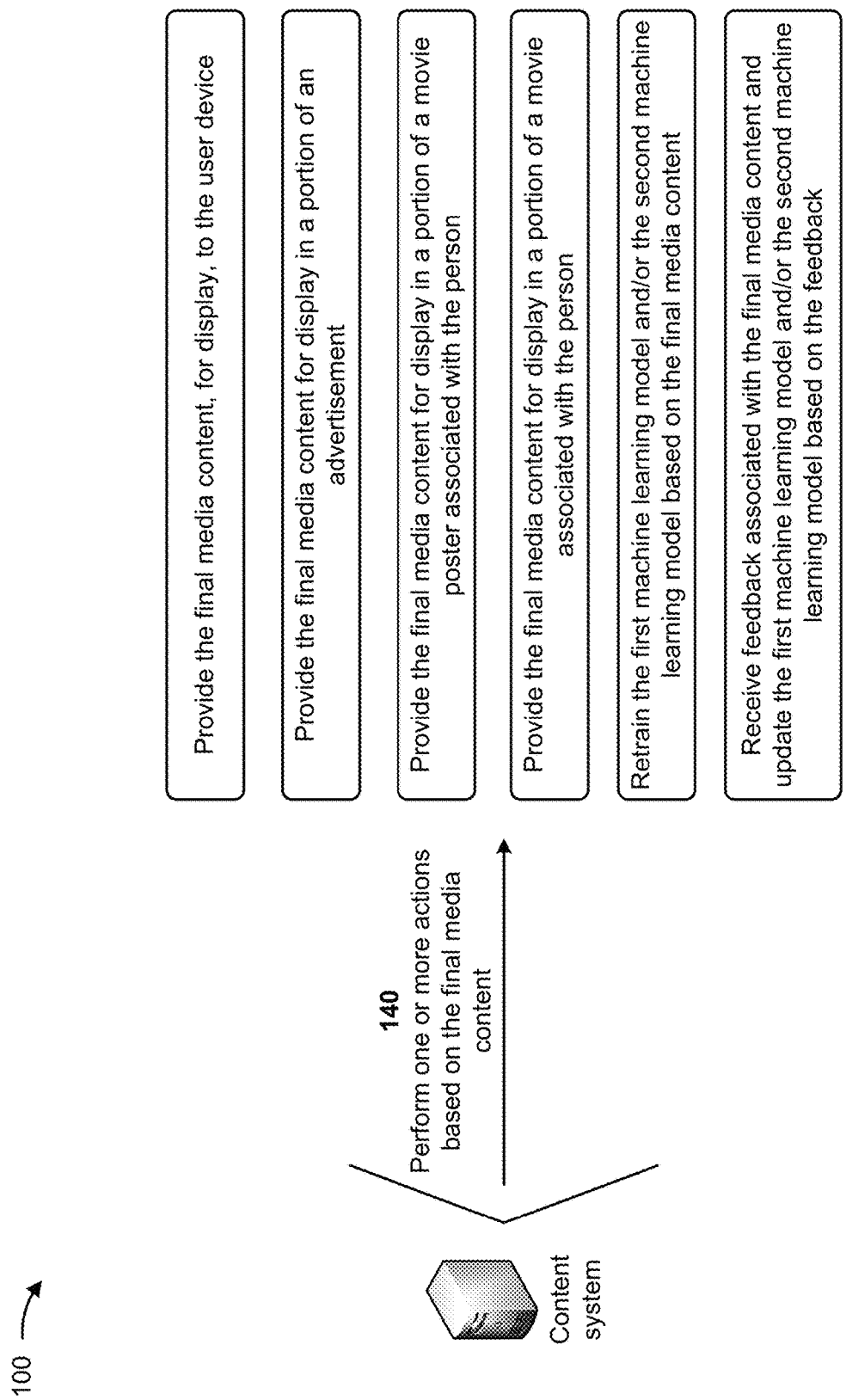

Turning to FIG. 1F, and reference number 140, the content system may perform one or more actions based on the final media content. In some implementations, the one or more actions may include providing the final media content, for display, to the user device. For example, the content system may send (e.g., via the network that connects the content system and the user device) the final media content to the user device to allow the user device to display the final media content on a display of the user device. In this way, the content system may allow the user to view the final media content. Accordingly, this may conserve computing resources (e.g., computing resources, memory resources, power resources, communication resources, and/or the like) of the user device that would have otherwise been consumed to generate the final media content.

In some implementations, the one or more actions may include providing the final media content for display in a portion of a movie associated with the person; providing the final media content for display in a portion of an advertisement (e.g., a video advertisement) associated with the person; or providing the final media content for display in a portion of a movie poster (e.g., a digital image movie poster) associated with the person. For example, the content system may identify a time segment of the movie and/or the advertisement that is associated with the final media content and may replace a portion of the movie and/or the advertisement (e.g., one or more images of the move and/or the advertisement) that corresponds to the time segment with the final media content. As another example, the content system may identify a portion of the movie poster (e.g., a physical area of the movie poster) that is associated with the final media content and may replace the portion of the movie poster with the final media content. In this way, the content system may cause the face of the user to appear to be part of the movie, the advertisement, and/or the movie poster, which had not previously been possible using just captured content provided by a user device. Accordingly, this may conserve computing resources (e.g., computing resources, memory resources, power resources, communication resources, and/or the like) of other devices (e.g., facial recognition and/or mapping devices, media processing devices, and/or the like) that would have otherwise been consumed to cause the face of the user to appear to be part of the movie, the advertisement, and/or the movie poster.

In some implementations, the one or more actions may include retraining the machine learning model and/or the additional machine learning model based on the final media content. For example the content system may use the final media content as additional training data to retrain and/or update the machine learning model and/or the additional machine learning model. In some implementations, the one or more actions may include receiving feedback associated with the final media content from the user device, and updating the machine learning model and/or the additional machine learning model based on the feedback. For example, the content system may provide (e.g., via the network) the final media content to the user device of the user and the user may interact with the user device to provide (e.g., via the network) feedback (e.g., approval or disapproval of the final media content, comments regarding the final media content, and/or the like) to the content system. The content system may cause the feedback to be used as additional training data to retrain and/or update the machine learning model and/or the additional machine learning model. In this way, the content system may improve the accuracy of the machine learning model and/or the additional machine learning model, which may improve a speed and/or an efficiency of the machine learning model and/or the additional machine learning model, which conserves computing resources of the content system.

In some implementations, the content system may perform one or more of the steps described above in relation to FIGS. 1B-1F and reference numbers 115-140 in near real-time relative to receiving the captured content and/or the media content (e.g., as described above in relation to FIG. 1A and reference numbers 105-110). For example, the content system may process the captured content to determine embeddings for the captured content; may process the media content to identify landmarks in the media content; may combine the captured content with the media content, based on the landmarks and the embeddings, to generate combined content; may segment a combined face of the combined content, to replace the second face of the media content with the combined face, and to generate new media content that includes the combined face; may blend the combined face in the new media content to blend the combined face in the new media content to generate the final media content; and/or may perform the one or more actions based on the final media content; among other examples, within a threshold amount of time (e.g., 1 second, 10 seconds, 1 minute, or 10 minutes, among other examples) of the content system receiving the captured content and/or the media content.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
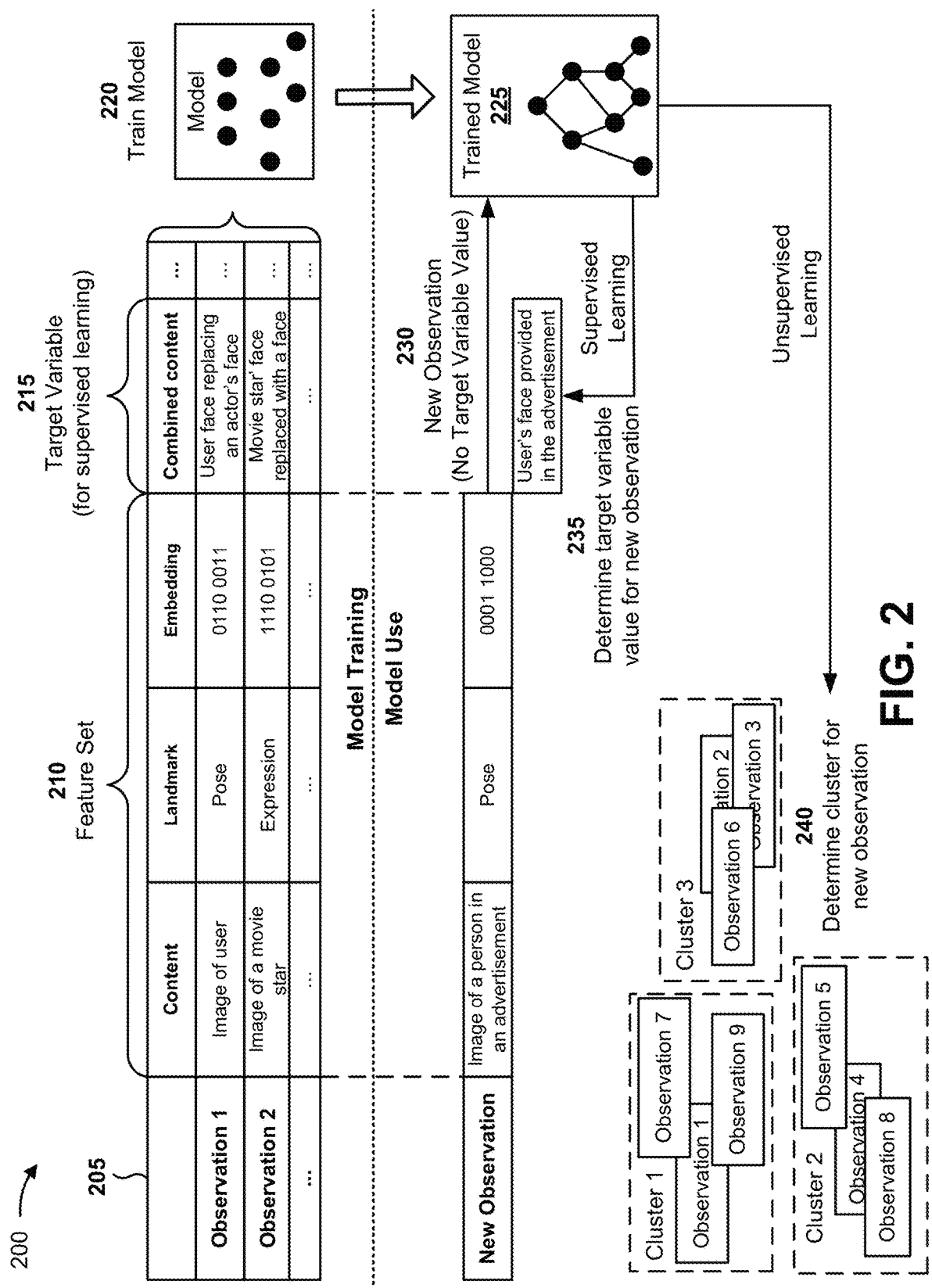
FIG. 2 is a diagram illustrating an example of training and using a machine learning model in connection with inserting user-generated content into media content.

FIG. 2 is a diagram illustrating an example 200 of training and using a machine learning model in connection with utilizing machine learning models for inserting user-generated content into media content. The machine learning model training and usage described herein may be performed using a machine learning system. The machine learning system may include or may be included in a computing device, a server, a cloud computing environment, or the like, such as the content system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the user device and/or the server device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device and/or the server device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of content (e.g., captured content or media content), a second feature of landmark, a third feature of embedding, and so on. As shown, for a first observation, the first feature may have a value of image of a user the second feature may have a value of pose, the third feature may have a value of 0110 0011, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels), may represent a variable having a Boolean value, and/or may represent a variable associated with an image. A target variable may be associated with a target variable value, and a target variable value may be specific to an observation. In example 200, the target variable is combined content, which has a value of user face replacing an actor's face for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, a GAN algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of an image of a person in an advertisement, a second feature of pose, a third feature of 0001 1000, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of a user's face provided in the advertisement for the target variable of combined content for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster, then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to generating combined content. The machine learning system enables recognition and/or identification of tens, hundreds, thousands, or millions of features and/or feature values for tens, hundreds, thousands, or millions of observations, thereby increasing accuracy and consistency and reducing delay associated with generating combined content relative to requiring computing resources to be allocated for tens, hundreds, or thousands of operators to manually generate combined content using the features or feature values. While some implementations described herein in relation to FIG. 2 are directed to generating combined content, the description provided herein in relation to FIG. 2 applies to training and applying a machine learning model to determine embeddings for captured content; to identify landmarks in media content; to segment a combined face of the combined content, to replace the second face of the media content with the combined face, and to generate new media content that includes the combined face; and/or to process the new media content to blend the combined face in the new media content and to generate final media content (e.g., as described herein in relation to FIGS. 1B-1E).

As indicated above, FIG. 2 is provided as an example. Other examples may differ from what is described in connection with FIG. 2.

Figure 3:
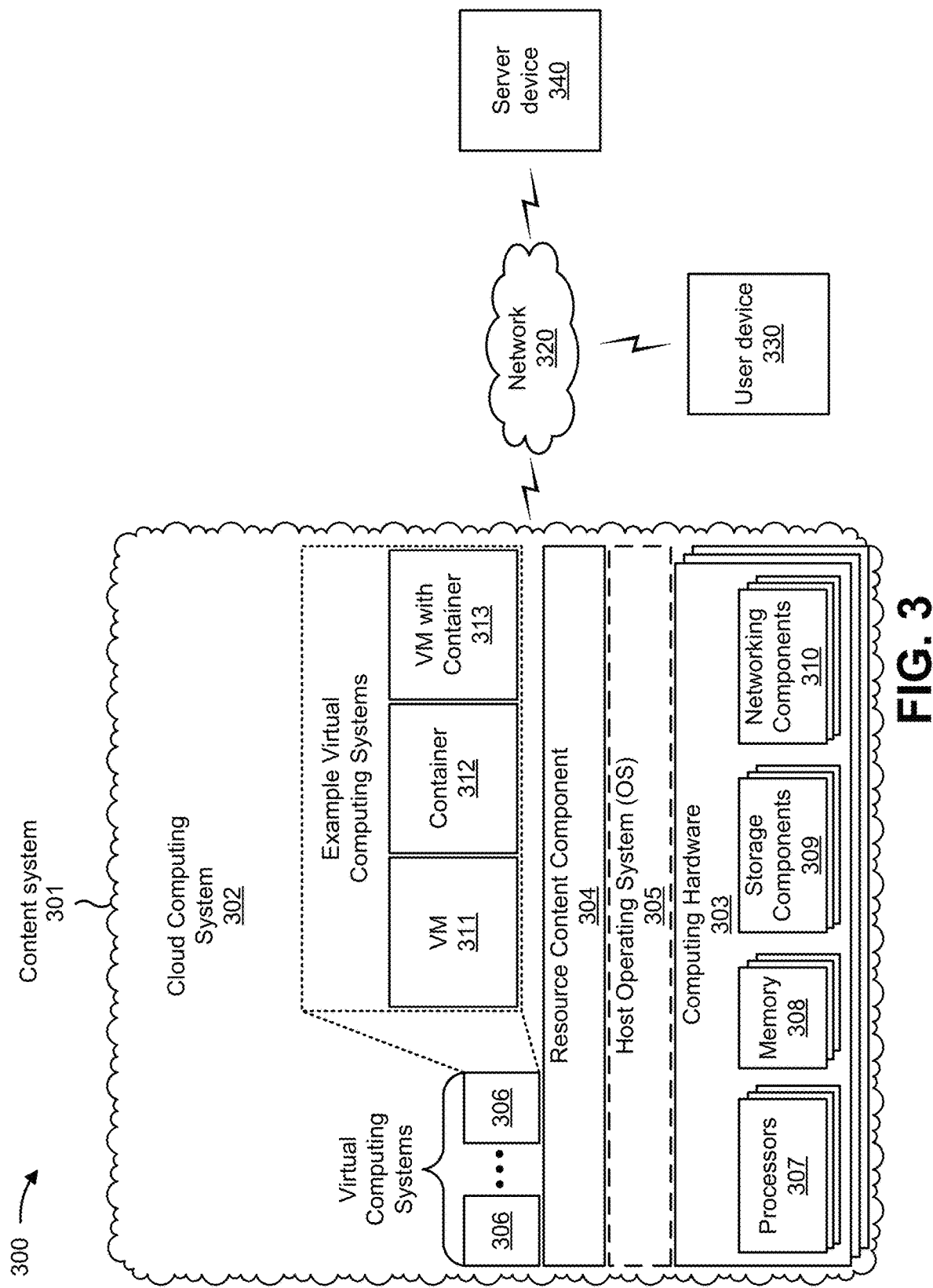
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a content system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the content system 301 may include one or more elements 303-313 of the cloud computing system 302, may execute within the cloud computing system 302, and/or may be hosted within the cloud computing system 302, in some implementations, the content system 301 may not be cloud-based (e.g., may be implemented outside of a cloud computing system) or may be partially cloud-based. For example, the content system 301 may include one or more devices that are not part of the cloud computing system 302, such as device 400 of FIG. 4, which may include a stand-alone server or another type of computing device. The content system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 330 includes one or more devices capable of receiving, generating, storing, processing, and/or providing information associated with providing captured content to the content system 301, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 340 includes one or more devices capable of receiving, generating, storing, processing, providing, and/or routing information associated with providing media content to the content system 301, as described elsewhere herein. The server device 340 may include a communication device and/or a computing device. For example, the server device 340 may include a server, such as an application server, a client server, a web server, a database server, a host server, a proxy server, a virtual server (e.g., executing on computing hardware), or a server in a cloud computing system. In some implementations, the server device 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
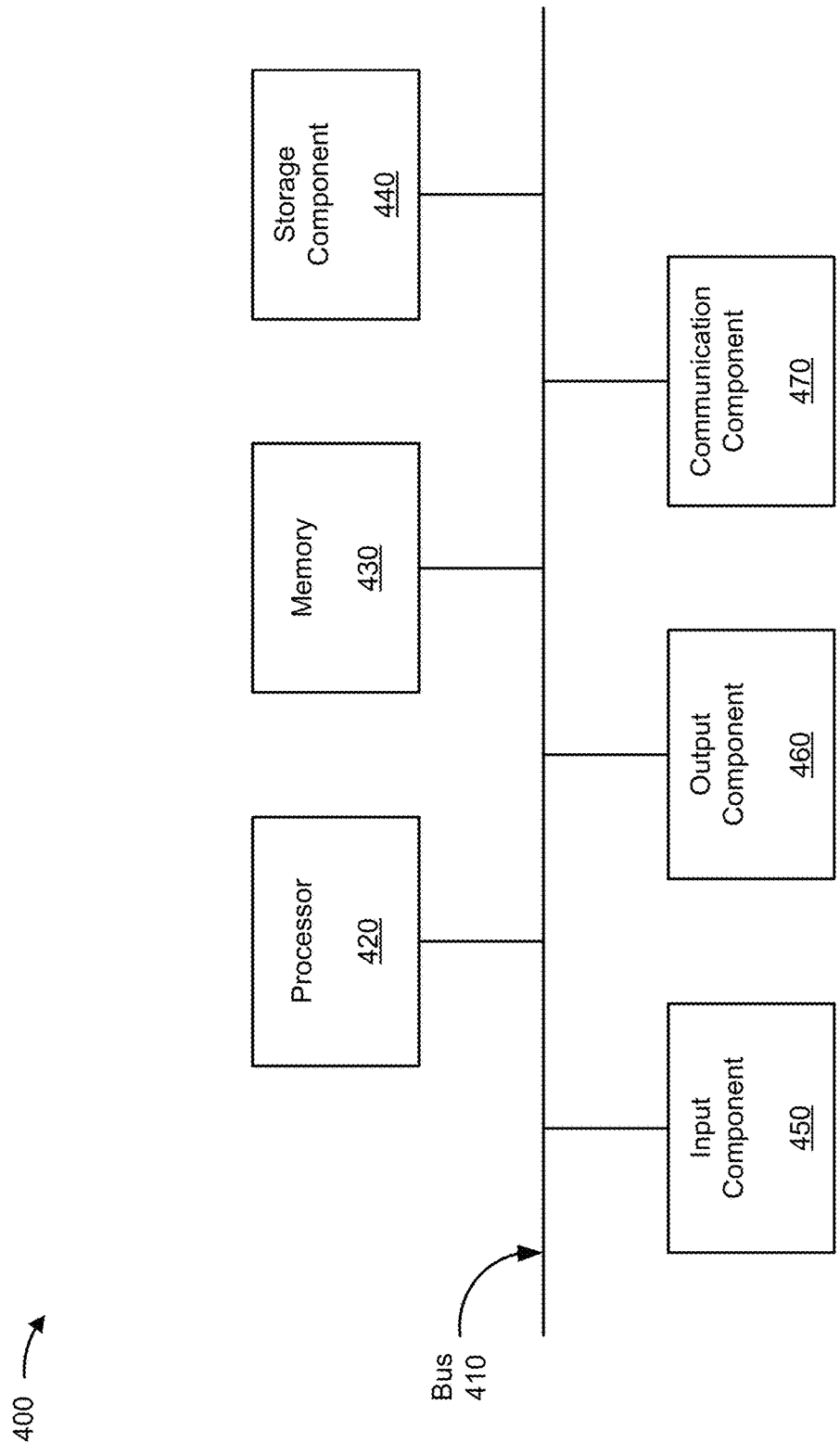
FIG. 4 is a diagram of example components of one or more devices of FIG. 3.

FIG. 4 is a diagram of example components of a device 400, which may correspond to content system 301, computing hardware 303, user device 330, and/or server device 340. In some implementations, content system 301, computing hardware 303, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing machine learning models for inserting user-generated content into media content. In some implementations, one or more process blocks of FIG. 5 may be performed by a system (e.g., content system 301). In some implementations, one or more process blocks of FIG. 5 may be performed by another device or a group of devices separate from or including the system, such as a user device (e.g., user device 330) and/or a server device 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving captured content identifying a first face of a user of a user device (block 510). For example, the system may receive captured content identifying a first face of a user of a user device, as described above.

As further shown in FIG. 5, process 500 may include receiving media content identifying a second face of a person appearing in media (block 520). For example, the system may receive media content identifying a second face of a person appearing in media, as described above.

As further shown in FIG. 5, process 500 may include processing the captured content, with a first machine learning model, to determine embeddings for the captured content (block 530). For example, the system may process the captured content, with a first machine learning model, to determine embeddings for the captured content, as described above.

As further shown in FIG. 5, process 500 may include processing the media content, with the first machine learning model, to identify landmarks in the media content (block 540). For example, the system may process the media content, with the first machine learning model, to identify landmarks in the media content, as described above.

As further shown in FIG. 5, process 500 may include utilizing the first machine learning model to combine the captured content with the media content, based on the landmarks and the embeddings, to generate combined content (block 550). For example, the system may utilize the first machine learning model to combine the captured content with the media content, based on the landmarks and the embeddings, to generate combined content, as described above.

As further shown in FIG. 5, process 500 may include utilizing the first machine learning model to segment a combined face of the combined content, to replace the second face of the media content with the combined face, and to generate new media content that includes the combined face (block 560). For example, the system may utilize the first machine learning model to segment a combined face of the combined content, to replace the second face of the media content with the combined face, and to generate new media content that includes the combined face, as described above.

As further shown in FIG. 5, process 500 may include processing the new media content, with a second machine learning model, to blend the combined face in the new media content and to generate final media content based on blending the combined face in the new media content (block 570).

For example, the system may process the new media content, with a second machine learning model, to blend the combined face in the new media content and to generate final media content based on blending the combined face in the new media content, as described above.

As further shown in FIG. 5, process 500 may include performing one or more actions based on the final media content (block 580). For example, the system may perform one or more actions based on the final media content, as described above.

In some implementations, performing the one or more actions comprises one or more of providing the final media content for display in a portion of a movie associated with the person, providing the final media content for display in a portion of an advertisement associated with the person, or providing the final media content for display in a portion of a movie poster associated with the person.

In some implementations, performing the one or more actions comprises providing the final media content to the user device, receiving feedback associated with the final media content from the user device, and updating one or more of the first machine learning model or the second machine learning model based on the feedback.

In some implementations, performing the one or more actions comprises retraining one or both of the first machine learning model or the second machine learning model based on the final media content.

In some implementations, the embeddings represent characteristics of the first face in a numerical fashion.

In some implementations, the landmarks describe one or more of a pose of the second face, an orientation of the second face, or an expression of the second face.

In some implementations, the system includes one or more devices that store the first machine learning model and one or more other devices that store the second machine learning model.

In some implementations, performing the one or more actions comprises providing the final media content for display in a portion of one or more of: a movie associated with the person, an advertisement associated with the person, or a movie poster associated with the person, as described above.

In some implementations, the first machine learning model includes a talking head generative adversarial network (GAN) model and the second machine learning model includes a face swapping GAN model.

In some implementations, processing the new media content, with the second machine learning model, to blend the combined face in the new media content and to generate the final media content includes processing the new media content, with the second machine learning model, to blend the combined face in the new media content and to generate the final media content in near real-time relative to receiving the captured content and the media content.

In some implementations, processing the captured content, with the first machine learning model, to determine the embeddings for the captured content includes cropping the captured content to remove content other than the first face of the user and to generate cropped content, and processing the cropped content, with the first machine learning model, to determine the embeddings for the captured content.

In some implementations, processing the media content, with the first machine learning model, to identify the landmarks in the media content includes cropping the media content to remove content other than the second face of the person and to generate cropped content, and processing the cropped content, with the first machine learning model, to identify the landmarks in the media content.

In some implementations, process 500 includes providing the final media content, for display, to the user device.

In some implementations, an orientation or an expression of the first face is different than an orientation or an expression of the second face.

In some implementations, performing the one or more actions comprises one or more of providing the final media content for display in a portion of a movie associated with the person, providing the final media content for display in a portion of an advertisement, providing the final media content for display in a portion of a movie poster associated with the person, or retraining one or more of the first machine learning model or the second machine learning model based on the final media content.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a computing system, captured content identifying a first face of a user of a user device;
  receiving, by the computing system, media content identifying a second face of a person appearing in media;
  processing, by the computing system, the captured content, with a first machine learning model, to determine embeddings for the captured content;
  processing, by the computing system, the media content, with the first machine learning model, to identify landmarks in the media content;
  utilizing, by the computing system, the first machine learning model to combine the captured content with the media content, based on the landmarks and the embeddings, to generate combined content;
  utilizing, by the computing system, the first machine learning model to segment a combined face of the combined content, to replace the second face of the media content with the combined face, and to generate new media content that includes the combined face,
    wherein utilizing the first machine learning model comprises:
      cropping the combined content to remove particular content other than the combined face from the combined content to generate cropped combined content, and
      generating the new media content based on combining the cropped combined content and the media content to generate the new media content;
  processing, by the computing system, the new media content, with a second machine learning model, to blend the combined face included in the new media content and to generate final media content based on blending the combined face in the new media content,
    wherein the second machine learning model is trained based on training data that includes example new media content, example combined faces that have been blended based on the example new media content, and example final media content, and
    wherein the second machine learning model is trained to identify one or more relationships between the new media content and the example combined faces to generate the final media content; and
  performing, by the computing system, one or more actions based on the final media content.

2. The method of claim 1, wherein performing the one or more actions comprises one or more of:
  providing the final media content for display in a portion of a movie associated with the person;
  providing the final media content for display in a portion of an advertisement associated with the person; or
  providing the final media content for display in a portion of a movie poster associated with the person.

3. The method of claim 1, wherein performing the one or more actions comprises:
  providing the final media content to the user device;
  receiving feedback associated with the final media content from the user device; and
  updating one or more of the first machine learning model or the second machine learning model based on the feedback.

4. The method of claim 1, wherein performing the one or more actions comprises:
  retraining one or both of the first machine learning model or the second machine learning model based on the final media content.

5. The method of claim 1, wherein the embeddings represent characteristics of the first face in a numerical fashion.

6. The method of claim 1, wherein the landmarks describe one or more of:
  a pose of the second face,
  an orientation of the second face, or
  an expression of the second face.

7. The method of claim 1, wherein the computing system includes one or more devices that store the first machine learning model and one or more other devices that store the second machine learning model.

8. A computing system, comprising:
  one or more memories; and
  one or more processors, communicatively coupled to the one or more memories, configured to:
    receive captured content identifying a first face of a user of a user device;
    receive media content identifying a second face of a person appearing in media;
    process the captured content, with a first machine learning model, to determine embeddings for the captured content;
    process the media content, with the first machine learning model, to identify landmarks in the media content;
    utilize the first machine learning model to combine the captured content with the media content, based on the landmarks and the embeddings, to generate combined content;
    utilize the first machine learning model to segment a combined face of the combined content, to replace the second face of the media content with the combined face, and to generate new media content that includes the combined face,
      wherein the one or more processors, to utilize the first machine learning model, are configured to:
        crop the combined content to remove particular content other than the combined face from the combined content to generate cropped combined content, and
        generate the new media content based on combining the cropped combined content and the media content to generate the new media content;
    process the new media content, with a second machine learning model, to blend the combined face included in the new media content and to generate final media content based on blending the combined face in the new media content,
      wherein the second machine learning model is trained based on training data that includes example new media content, example combined faces that have been blended based on the example new media content, and example final media content, and wherein the second machine learning model is trained to identify one or more relationships between the new media content and the example combined faces to generate the final media content; and provide the final media content for display in a portion of one or more of:
a movie associated with the person,
an advertisement associated with the person, or
a movie poster associated with the person.

9. The computing system of claim 8, wherein the first machine learning model includes a talking head generative adversarial network (GAN) model and the second machine learning model includes a face swapping GAN model.

10. The computing system of claim 8, wherein the one or more processors, when processing the new media content, with the second machine learning model, to blend the combined face in the new media content and to generate the final media content, are configured to:
process the new media content, with the second machine learning model, to blend the combined face in the new media content and to generate the final media content in near real-time relative to receiving the captured content and the media content.

11. The computing system of claim 8, wherein the one or more processors, when processing the captured content, with the first machine learning model, to determine the embeddings for the captured content, are configured to:
crop the captured content to remove content other than the first face of the user and to generate cropped content; and
process the cropped content, with the first machine learning model, to determine the embeddings for the captured content.

12. The computing system of claim 8, wherein the one or more processors, when processing the media content, with the first machine learning model, to identify the landmarks in the media content, are configured to:
crop the media content to remove content other than the second face of the person and to generate cropped content; and
process the cropped content, with the first machine learning model, to identify the landmarks in the media content.

13. The computing system of claim 8, wherein the one or more processors are further configured to:
provide the final media content, for display, to the user device.

14. The computing system of claim 8, wherein an orientation or an expression of the first face is different than an orientation or an expression of the second face.

15. A non-transitory computer-readable medium storing a set of instructions, the set of instructions comprising:
one or more instructions that, when executed by one or more processors of a computing system, cause the computing system to:
receive captured content identifying a first face of a user of a user device;
receive media content identifying a second face of a person appearing in media;
crop the captured content to remove content other than the first face of the user and to generate first cropped content;

crop the media content to remove content other than the second face of the person and to generate second cropped content;

process the first cropped content, with a first machine learning model, to determine embeddings for the captured content;

process the second cropped content, with the first machine learning model, to identify landmarks in the media content;

utilize the first machine learning model to combine the captured content with the media content, based on the landmarks and the embeddings, to generate combined content;

utilize the first machine learning model to segment a combined face of the combined content, to replace the second face of the media content with the combined face, and to generate new media content that includes the combined face, wherein the one or more instructions, that cause the one or more processors to utilize the first machine learning model, cause the one or more processors to:

crop the combined content to remove particular content other than the combined face from the combined content to generate cropped combined content, and generate the new media content based on combining the cropped combined content and the media content to generate the new media content;

process the new media content, with a second machine learning model, to blend the combined face included in the new media content and to generate final media content based on blending the combined face in the new media content, wherein the second machine learning model is trained based on training data that includes example new media content, example combined faces that have been blended based on the example new media content, and example final media content, and wherein the second machine learning model is trained to identify one or more relationships between the new media content and the example combined faces to generate the final media content; and perform one or more actions based on the final media content.

16. The non-transitory computer-readable medium of claim 15, wherein the one or more instructions, that cause the computing system to perform the one or more actions, cause the computing system to one or more of:
provide the final media content for display in a portion of a movie associated with the person;
provide the final media content for display in a portion of an advertisement;
provide the final media content for display in a portion of a movie poster associated with the person; or
retrain one or more of the first machine learning model or the second machine learning model based on the final media content.

17. The non-transitory computer-readable medium of claim 15, wherein the one or more instructions, that cause the computing system to perform the one or more actions, cause the computing system to:
- provide the final media content to the user device;
- receive feedback associated with the final media content from the user device; and
- update one or more of the first machine learning model or the second machine learning model based on the feedback.

18. The non-transitory computer-readable medium of claim 15, wherein the computing system includes one or more devices that store first machine learning model and one or more other devices that store the second machine learning model.

19. The non-transitory computer-readable medium of claim 15, wherein the first machine learning model includes a talking head generative adversarial network (GAN) model and the second machine learning model includes a face swapping GAN model.

20. The non-transitory computer-readable medium of claim 15, wherein the one or more instructions, that cause the computing system to process the new media content, with the second machine learning model, to blend the combined face in the new media content and to generate the final media content, cause the computing system to:
- process the new media content, with the second machine learning model, to blend the combined face in the new media content and to generate the final media content in near real-time relative to receiving the captured content and the media content.

\* \* \* \* \*